(12) United States Patent
Pollack et al.

(10) Patent No.: US 11,014,502 B2
(45) Date of Patent: May 25, 2021

(54) INSERT-MOLDING OF LENS INTO REAR VIEW MIRROR HOUSING (71) Applicant: Gentex Corporation, Zeeland, MI (US)

(72) Inventors: Christopher D. Pollack, Zeeland, MI (US); Eric S. Sloterbeek, Hudsonville, MI (US); William M. Vanden Bos, Grand Rapids, MI (US)

(73) Assignee: GENTEX CORPORATION, Zeeland, MI (US)

(*) Notice: Subject to any disclaimer, the term of this patent is extended or adjusted under 35 U.S.C. 154(b) by 133 days.

(21) Appl. No.: 16/362,921

(22) Filed: Mar. 25, 2019

(65) Prior Publication Data
US 2019/0299867 A1    Oct. 3, 2019

Related U.S. Application Data (60) Provisional application No. 62/648,765, filed on Mar. 27, 2018.

(51) Int. Cl.
B29D 11/00      (2006.01)
B60R 1/12       (2006.01)
B60R 1/04       (2006.01)
G02B 7/02       (2021.01)
B29K 655/02     (2006.01)
B29K 669/00     (2006.01)

(52) U.S. Cl.
CPC .......... B60R 1/12 (2013.01); B29D 11/00596 (2013.01); B60R 1/04 (2013.01); G02B 7/02 (2013.01); B29K 2655/02 (2013.01); B29K 2669/00 (2013.01); B60R 2001/1223 (2013.01)

(58) Field of Classification Search
CPC ..... B60R 1/12; B60R 1/04; B60R 2001/1223; B60R 1/088; G02B 7/02; G02B 7/00; G02B 7/001; G02B 7/002; G02B 7/003; G02B 7/004; G02B 7/005; G02B 7/008; B29D 11/00596; B29K 2655/02; B29K 2669/00
USPC ......................................................... 359/811
See application file for complete search history.

(56) References Cited

U.S. PATENT DOCUMENTS

| | | | |
|---|---|---|---|
| 5,615,857 A | 4/1997 | Hook | |
| 7,543,946 B2* | 6/2009 | Ockerse | ................. B60R 1/088 250/216 |
| 8,620,523 B2 | 12/2013 | Nelson et al. | |
| 9,224,889 B2 | 12/2015 | Fish, Jr. et al. | |
| D750,979 S | 3/2016 | Roth | |
| 2004/0000737 A1* | 1/2004 | Durr | ................... B29C 44/1271 264/46.6 |
| 2016/0159287 A1 | 6/2016 | Minikey, Jr. et al. | |
| 2018/0158435 A1 | 6/2018 | Nelson et al. | |

FOREIGN PATENT DOCUMENTS

EP    2740003 B1    6/2017

* cited by examiner

Primary Examiner — William R Alexander
Assistant Examiner — Henry A Duong
(74) Attorney, Agent, or Firm — Price Heneveld LLP; Bradley D. Johnson (57) ABSTRACT A rear view assembly includes a housing, an electro-optic assembly disposed within the housing, and an ambient light sensor operably coupled with the electro-optic assembly. An at least partially light transmissive light sensor lens is integrally formed as part of the housing proximate the ambient light sensor. The light sensor lens is free of mechanical fasteners.

18 Claims, 11 Drawing Sheets

INSERT-MOLDING OF LENS INTO REAR VIEW MIRROR HOUSING

CROSS-REFERENCE TO RELATED APPLICATION

This application claims priority to and the benefit under 35 U.S.C. § 119(e) of U.S. Provisional Application No. 62/648,765, filed on Mar. 27, 2018, entitled "INSERT-MOLDING OF LENS INTO REAR VIEW MIRROR HOUSING," the disclosure of which is hereby incorporated herein by reference in its entirety.

FIELD OF THE DISCLOSURE

The present disclosure generally relates to a rear view assembly, and more particularly to a rear view assembly that includes an integrally formed lens for use with a light sensor.

SUMMARY OF THE DISCLOSURE

According to one aspect of the present disclosure, a rear view assembly includes a housing, an electro-optic assembly disposed within the housing, and an ambient light sensor operably coupled with the electro-optic assembly. An at least partially light transmissive light sensor lens is integrally formed as part of the housing proximate the ambient light sensor. The light sensor lens is free of mechanical fasteners.

According to another aspect of the present disclosure, a rear view assembly includes a housing. An electro-optic assembly is disposed within the housing. The rear view assembly also includes an ambient light sensor operably coupled with the electro-optic assembly. An at least partially light transmissive light sensor lens is integrally formed as part of the housing proximate the ambient light sensor. The light sensor lens includes a body having a plurality of ridges disposed on at least one side of the body. The light sensor lens also includes a circumferential flange embedded within the housing.

According to yet another aspect of the present disclosure, a method of making a rear view assembly includes providing a first mold half, inserting an at least partially light transmissive light sensor into the first mold half, and operably coupling a second mold half to the first mold half. A polymeric material is injected between the first mold half and the second mold half to define at least a portion of a rear view assembly housing. The rear view assembly housing is removed from the first and second mold halves, an electro-optic assembly is inserted into the housing, and an ambient light sensor is positioned proximate the light sensor lens.

These and other features, advantages, and objects of the present disclosure will be further understood and appreciated by those skilled in the art by reference to the following specification, claims, and appended drawings.

DETAILED DESCRIPTION

The present illustrated embodiments reside primarily in combinations of method steps and apparatus components related to a rear view assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1A:
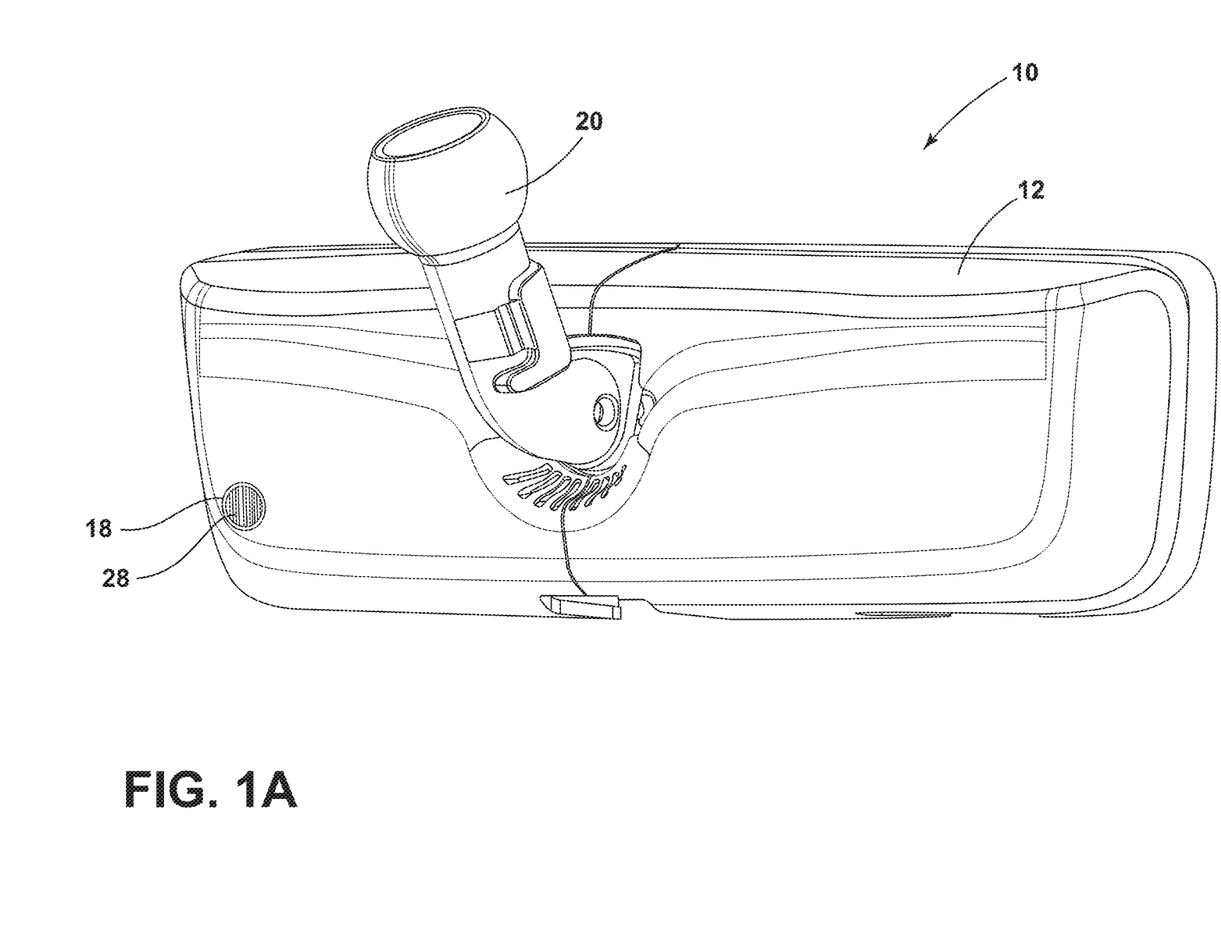
FIG. 1A is a rear perspective view of a rear view assembly.

For purposes of description herein, the terms "upper," "lower," "right," "left," "rear," "front," "vertical," "horizontal," and derivatives thereof, shall relate to the disclosure as oriented in FIG. 1A. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 1B:
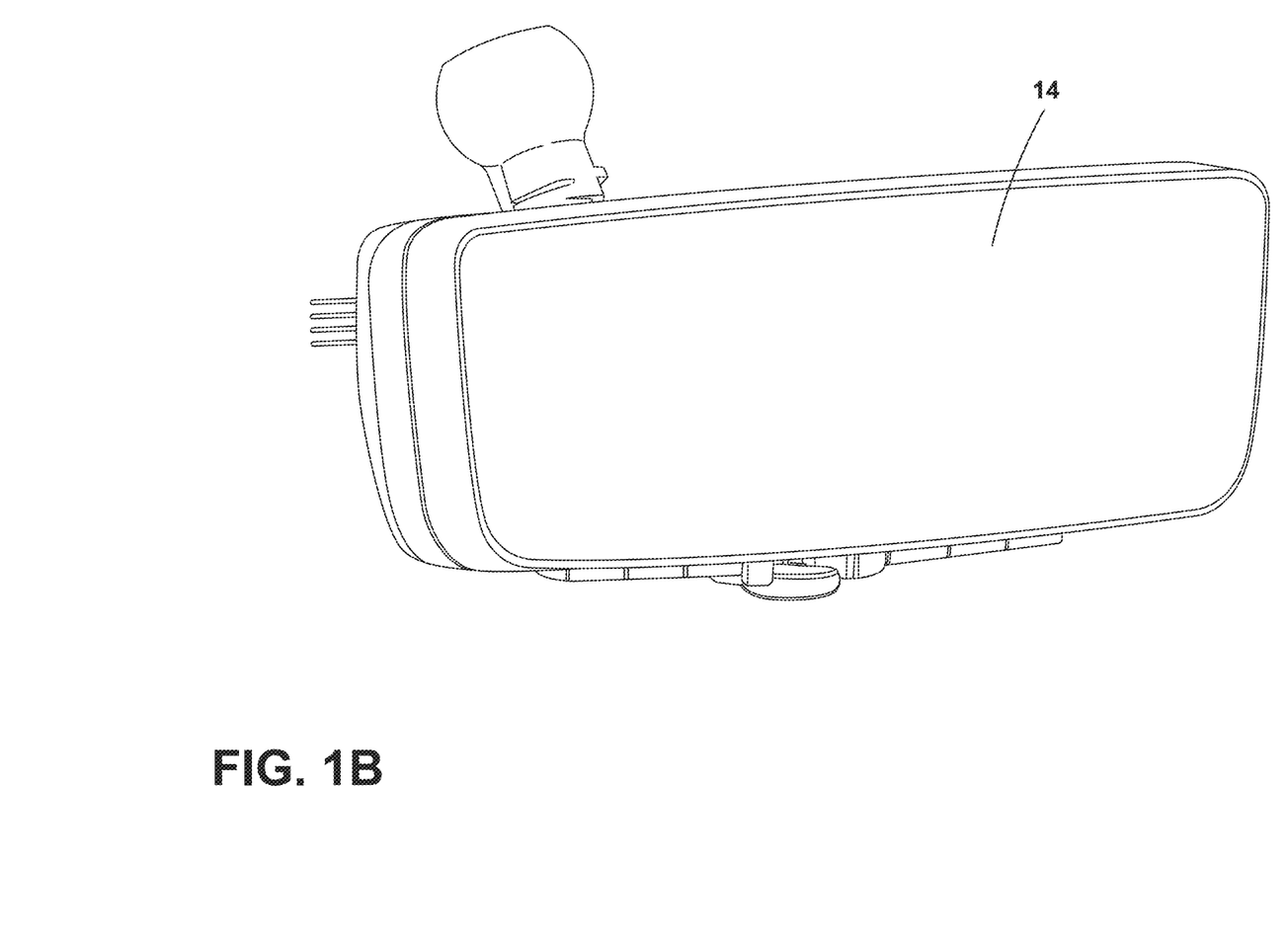
FIG. 1B is a front perspective view of a rear view assembly.

Referring to FIGS. 1A-12, reference numeral 10 generally designates a rear view assembly that includes a housing 12, an electro-optic assembly 14 (FIG. 1B) disposed within the housing 12, and an ambient light sensor 16 (FIG. 2) operably coupled with the electro-optic assembly 14. An at least partially light transmissive light sensor lens 18 is integrally formed as part of the housing 12 proximate the ambient light sensor 16. The light sensor lens 18 is free of mechanical fasteners.

Figure 2:
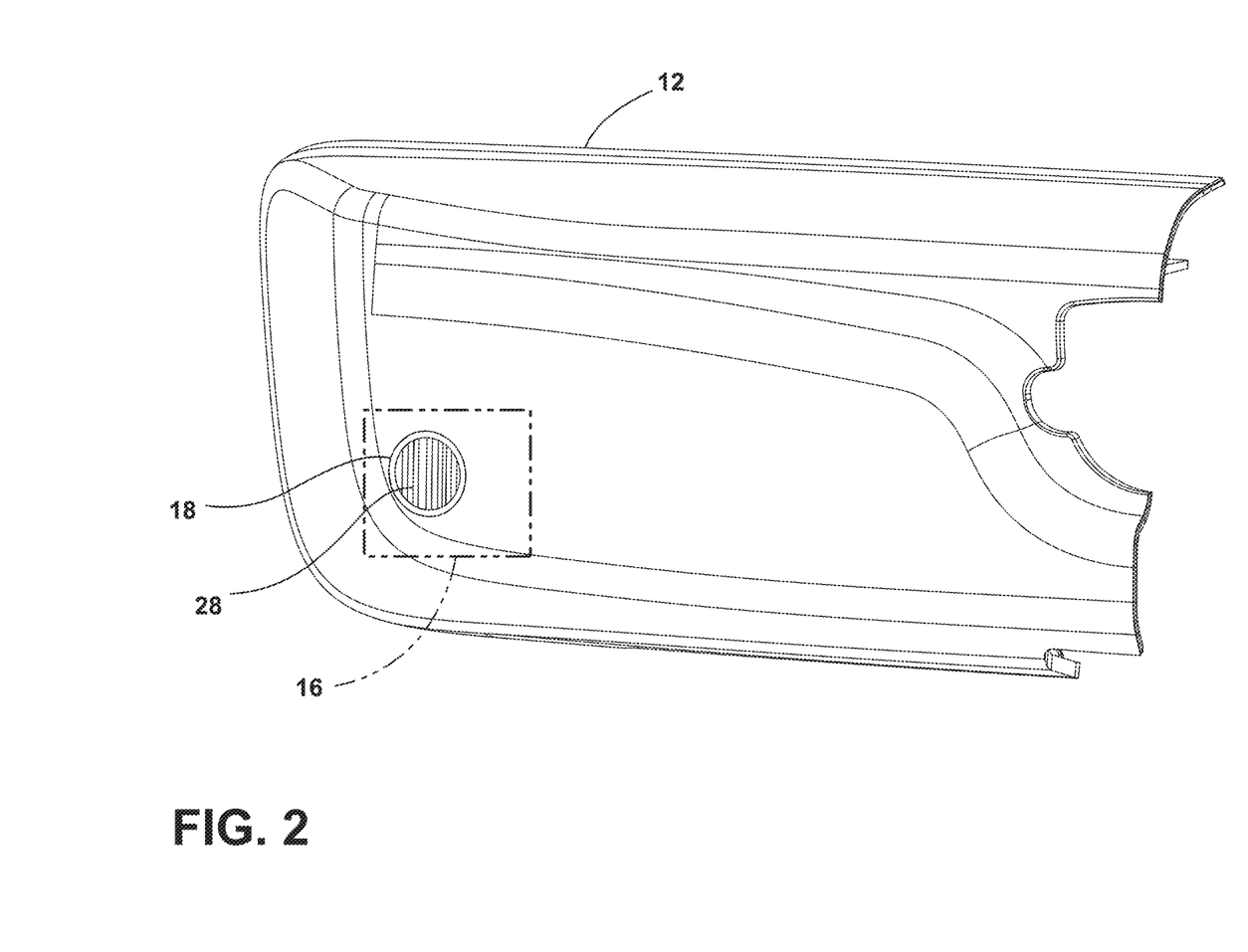
FIG. 2 is a rear perspective view of an external side of a light sensor lens integrally formed with a housing of a rear view assembly.

With reference again FIG. 1A, the illustrated rear view assembly 10 includes a mount 20 configured to extend into and attach with the housing 12. The mount 20 may be a single ball or two ball mount construction. As shown in FIG. 2, the ambient light sensor 16 is positioned inside the housing 12 and configured to measure ambient light conditions around the rearview assembly 10. The ambient light sensor 16, to perform optimally, is generally optically communicating with a lens that provides an interface from the ambient light sensor 16 to ambient lighting outside the rear view assembly 10. The ambient light sensor 16 may be positioned anywhere on or within a rear wall 15 (FIGS. 7-9) of the housing 12 or electro-optic assembly 14 within the rear view assembly 10. In one instance, the light sensor lens 18 is positioned in a bottom inside corner of the housing 12. The light sensor lens 18 may take on any number of constructions. In the illustrated embodiment, the light sensor lens 18 includes a body 19 with a generally circular configuration and a protrusion 21 that extends therefrom. However, the light sensor lens 18 could also include an oval, square, rectangle, triangle, etc. configuration.

Figure 3:
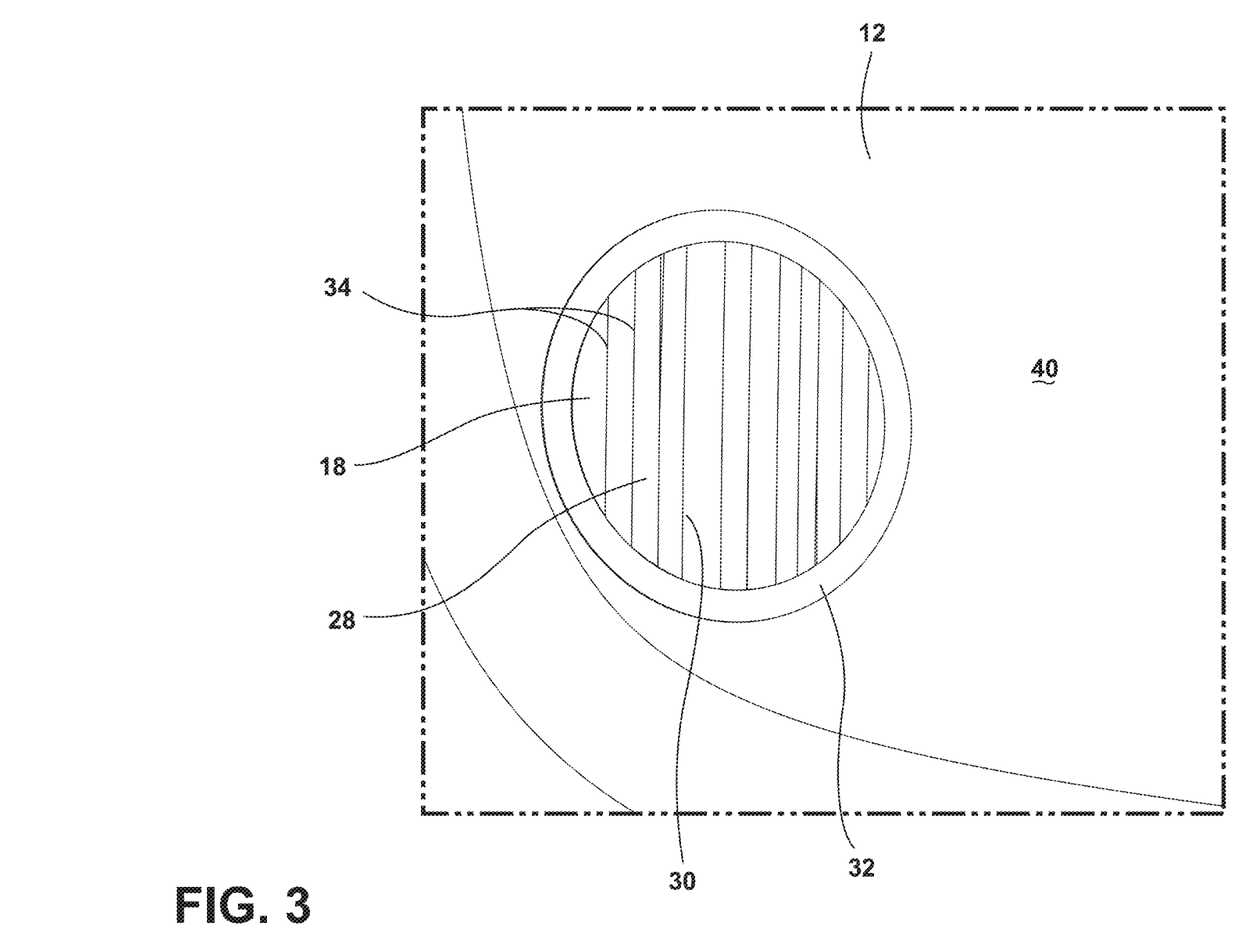
FIG. 3 is an enlarged rear perspective view of the light sensor lens of FIG. 2.
Figure 4:
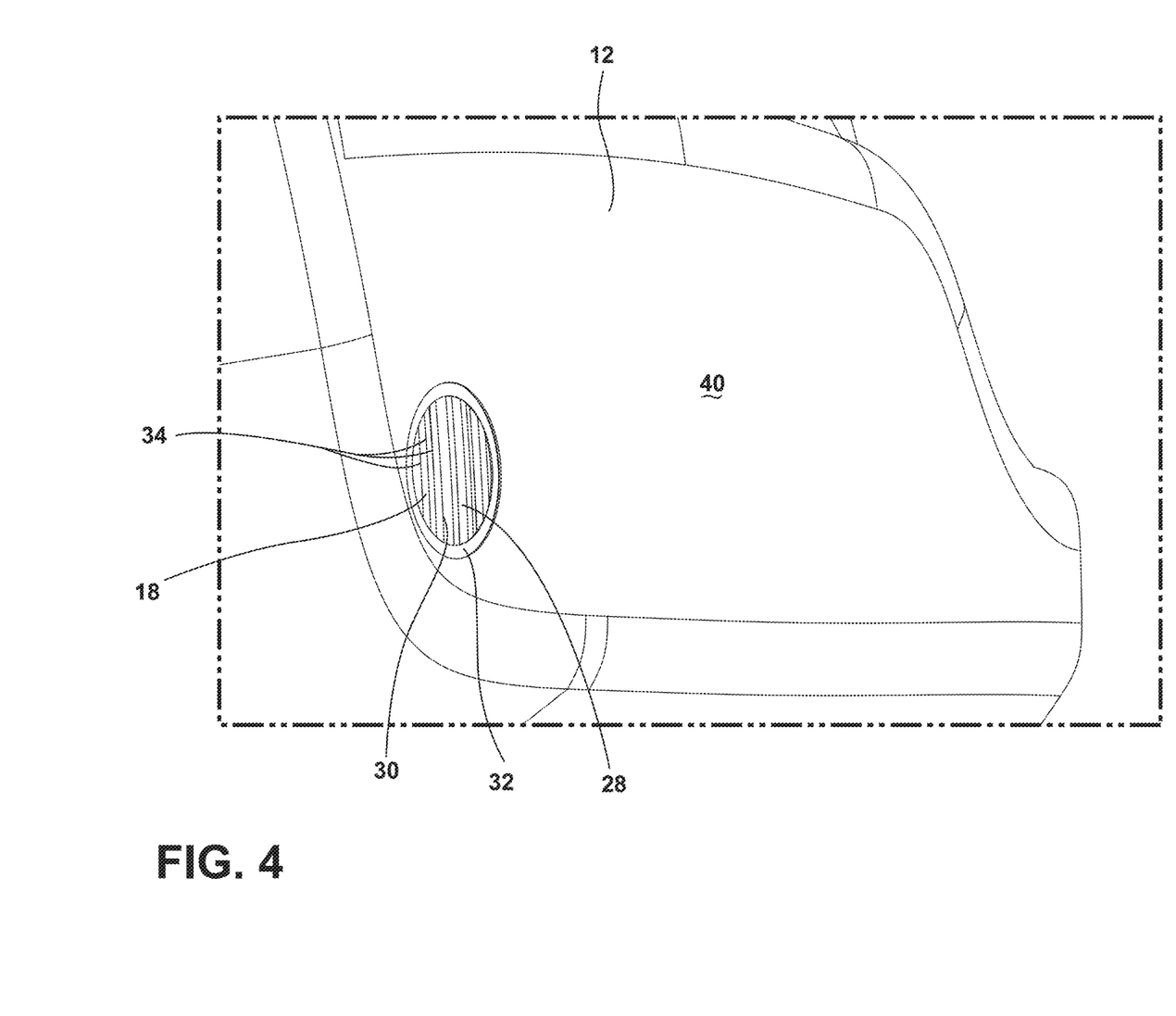
FIG. 4 is an enlarged side perspective view of the light sensor lens of FIG. 2.

As shown in FIGS. 2 and 3, an external surface 28 of the light sensor lens 18 includes an inner portion 30 and a circumferential portion 32. The inner portion 30 includes a plurality of ridges 34 that are generally vertically oriented. Although the ridges 34 are shown on the external surface 28 of the light sensor lens 18, the ridges 34 could also be positioned on an internal surface 36 of the light sensor lens 18. The ridges 34 are configured to aid in directing ambient light into the light sensor 16 from outside the rear view assembly 10. It is generally contemplated that the ridges 34 could also be oriented in a diagonal or horizontal direction. Moreover, it is also contemplated that the ridges 34 could be oriented vertically, as shown, and also include intersecting horizontal, diagonal, or possibly circular ridges that coincide with the vertical ridges 34. As can be further seen in FIGS. 2 and 3, the circumferential portion 32 of the light sensor lens 18 is generally flush with an outside surface 40 of the housing 12. Accordingly, the peripheral smooth surface of the circumferential portion 32 of the light sensor lens 18 appears to be aligned with the outside surface 40 of the rear housing 12 to create a generally smooth transition from the light sensor lens 18 to the outside surface 40 of the housing 12. In some instances, the circumferential portion 32 may be slightly recessed into the housing 12 or may protrude slightly from the housing 12. This construction provides an aesthetic component to the housing 12 and also helps the ambient light sensor lens 18 to capture ambient light rays that otherwise may not be possible to capture if the light sensor lens 18 was recessed deeply into the rear wall 15 of the housing 12.

Figure 5:
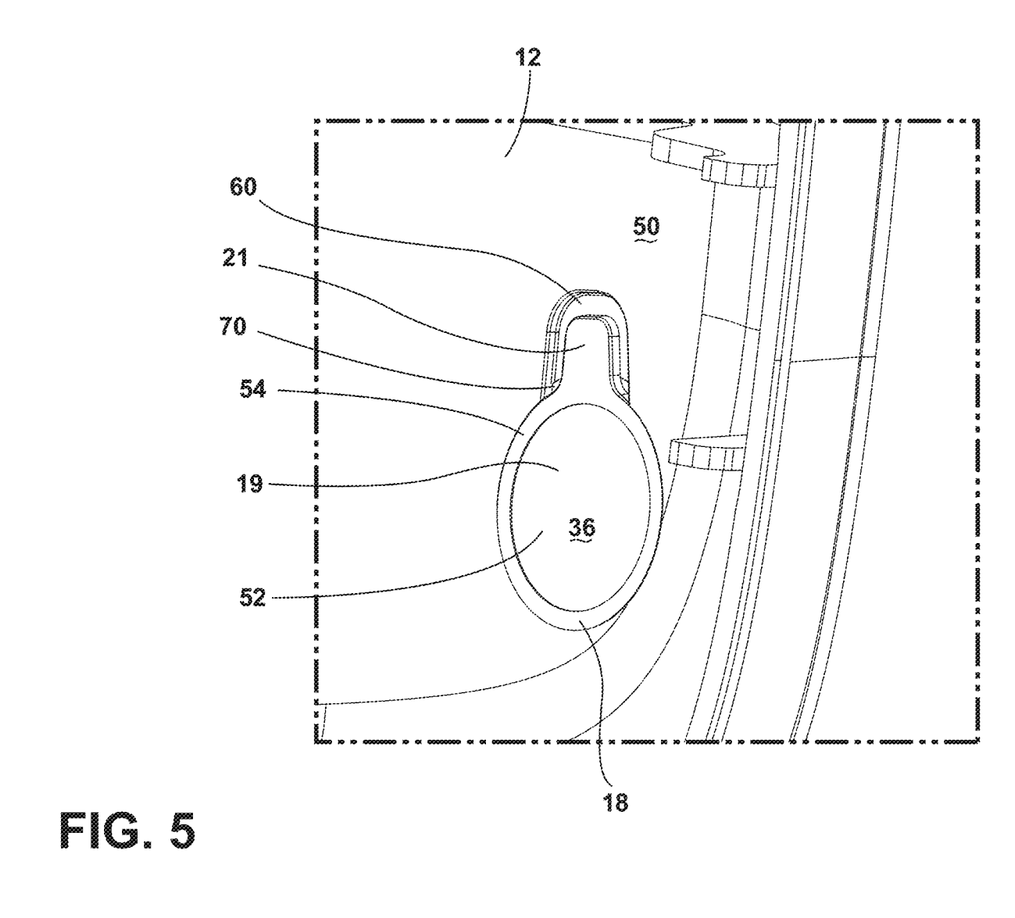
FIG. 5 is an enlarged side perspective view of an internal side of a light sensor lens of the present disclosure.
Figure 6:
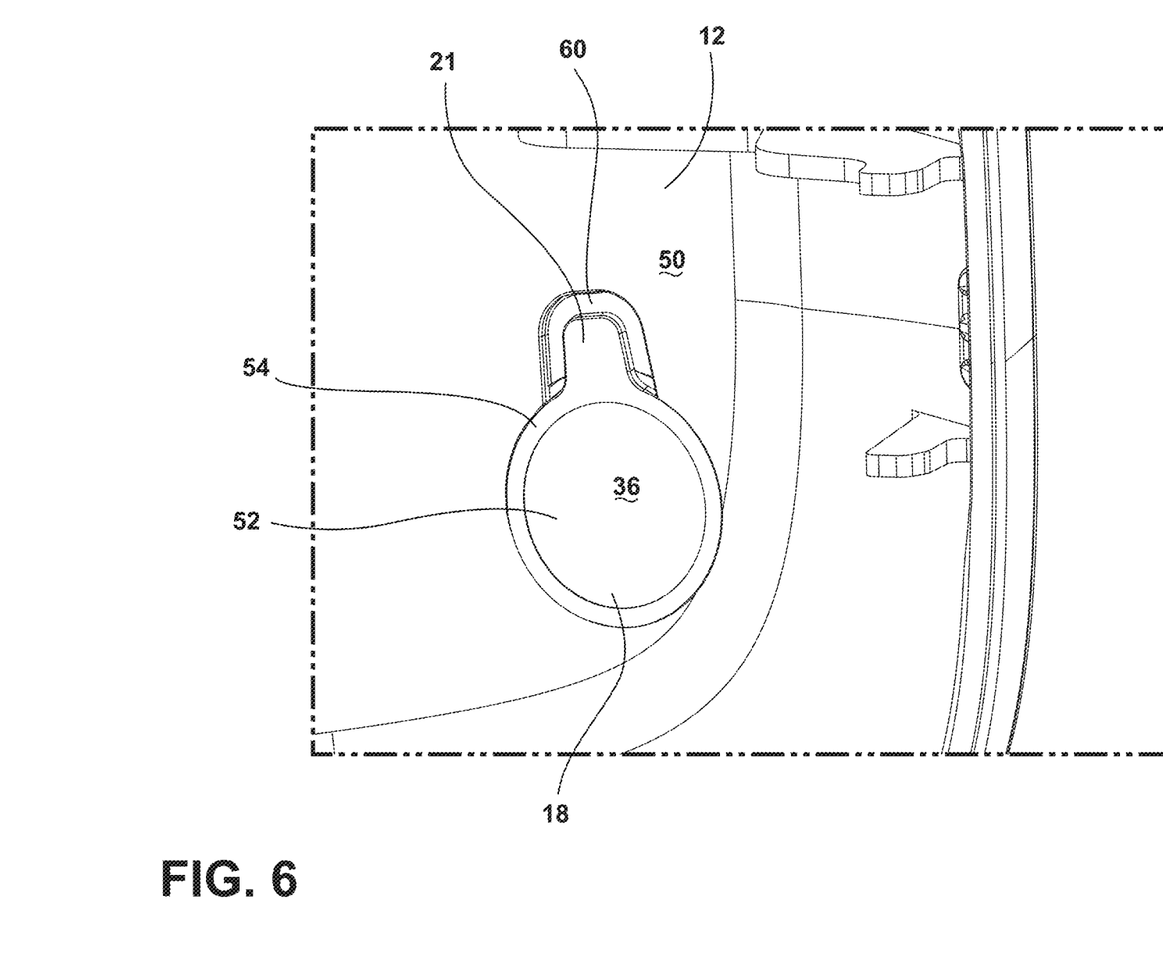
FIG. 6 is a side perspective view of an internal side of a light sensor lens of the present disclosure.
Figure 7:
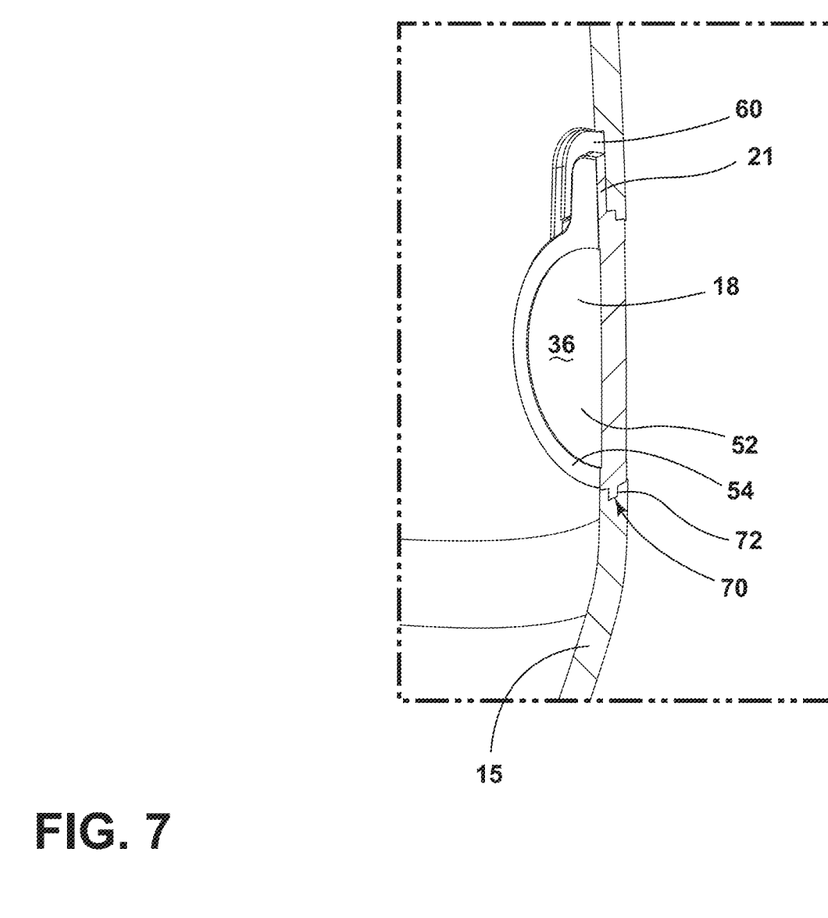
FIG. 7 is a side cross-sectional view of an internal side of a light sensor lens of the present disclosure.
Figure 8:
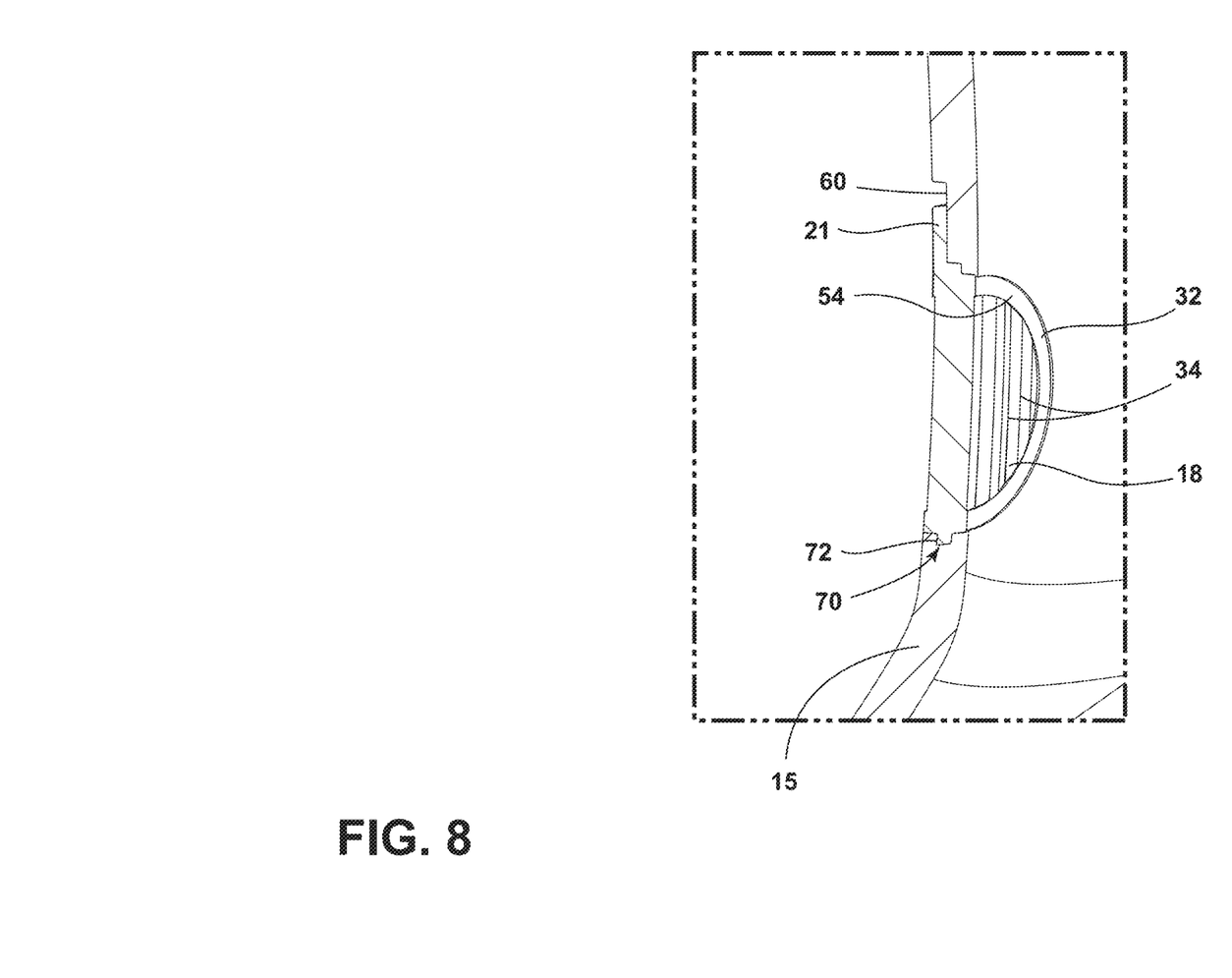
FIG. 8 is a side cross-sectional view of an external side of a light sensor lens of the present disclosure.
Figure 9:
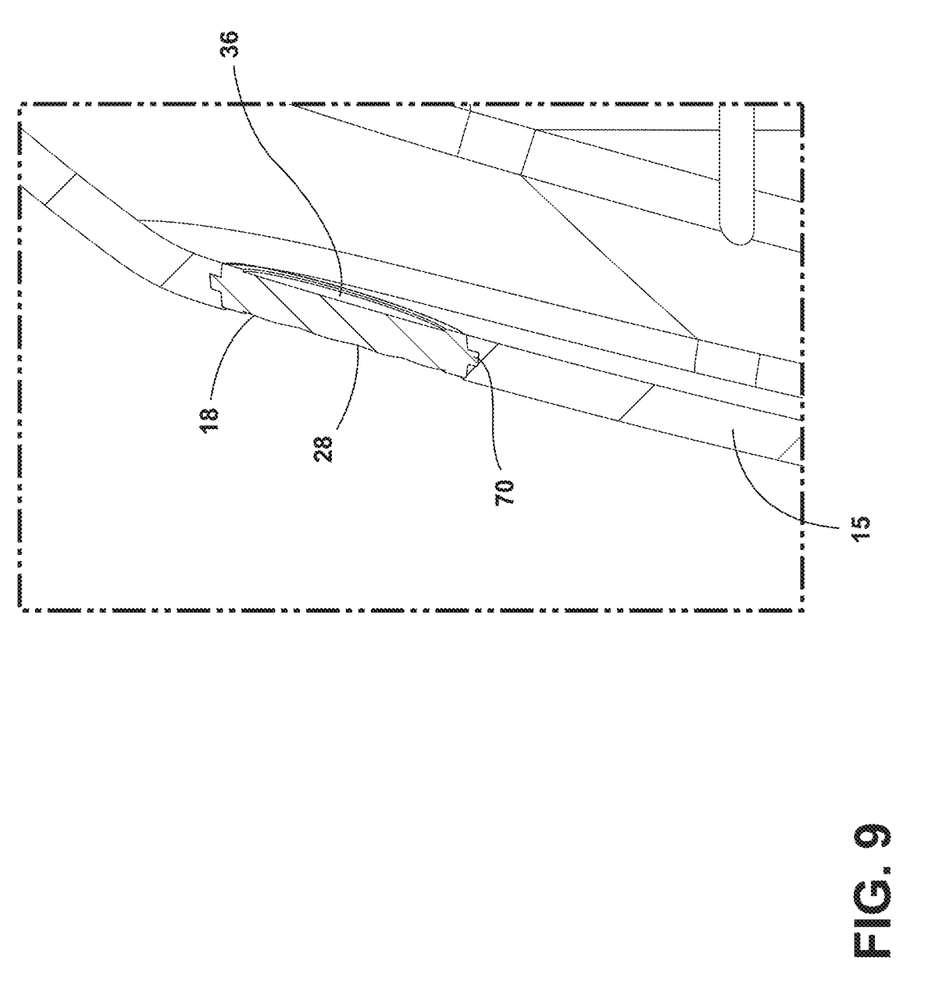
FIG. 9 is a side cross-sectional view of a light sensor lens of the present disclosure.

With reference now to FIGS. 5 and 6, the internal surface 36 of the light sensor lens 18 is also generally flush with an inside surface 50 of the rear housing 12. The internal surface 36 of the light sensor lens 18 includes an inner portion 52 and a peripheral portion 54, with the protrusion 21 extending upwardly therefrom. In one embodiment, the protrusion 21 extends from the body 19 and is visible only on the inside of the housing 12. The housing 12 conceals the protrusion 21 from view outside the housing 12. The peripheral portion 54 is generally flush with the inside surface 50 of the housing 12. However, the peripheral portion 54 may be coplanar with, protrude slightly from, or be recessed slightly relative to the inner portion 52 of the internal surface 36 of the light sensor lens 18. The inside surface 50 of the housing 12 also includes an enlarged space 60 configured to receive the protrusion 21 of the light sensor lens 18. The space 60 is larger than the light sensor lens 18 and is generally formed during the molding process as set forth herein. It is generally contemplated that the space 60 could be larger to accommodate a larger protrusion 21 of the light sensor lens 18, or could be eliminated completely in some instances.

With reference now to FIGS. 5 and 7-9, the light sensor lens 18 includes an intermediate circumferential flange 70. The circumferential flange 70 is positioned between the external surface 28 and the internal surface 36 of the light sensor lens 18. Although, the circumferential flange 70 does not extend about the protrusion 21 in FIGS. 5 and 7-9, it will be understood that the circumferential flange 70 could extend about the protrusion 21. The circumferential flange 70 is constructed to be embedded within the housing 12. More specifically, the circumferential flange 70 is received inside a circumferential slot 72 (receiving slot) defined within the rear wall 15 of the housing 12. The circumferential flange 70 and the circumferential slot 72 have a mating interface that securely couples the light sensor lens 18 with the housing 12. Accordingly, after the molding process is complete, application of pressure from inside or outside the housing 12 will not result in removal of the light sensor lens 18. As noted above, it will be understood that the internal surface 36 of the light sensor lens 18 may also vary to include ridges on the internal surface 36 of the light sensor lens 18 in addition to, or instead of, the ridges 34 disposed on the external surface 28 of the light sensor lens 18. As illustrated, the internal surface 36 includes a generally planar configuration.

Figure 10:
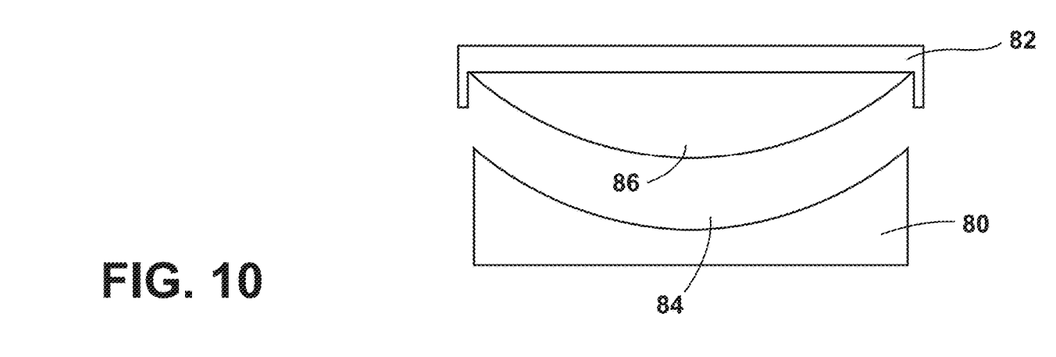
FIG. 10 is a schematic view illustrating two mold halves prior to molding of a housing for a rear view assembly.
Figure 11:
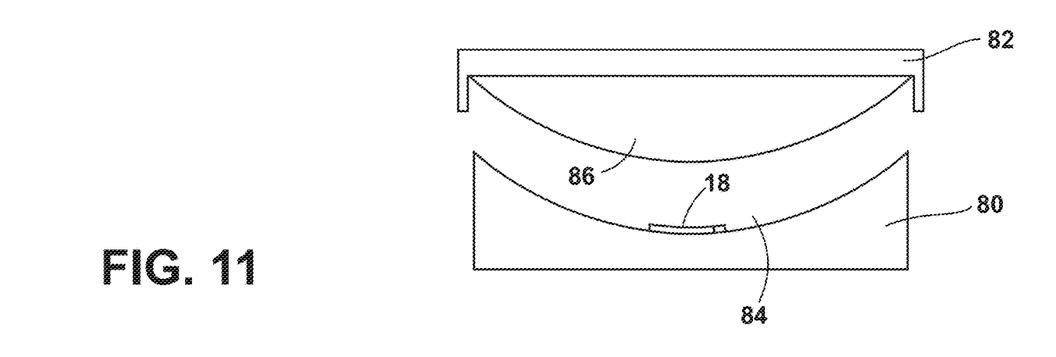
FIG. 11 is a schematic view illustrating two mold halves prior to molding of a housing for a rear view assembly with a light sensor lens placed between the mold halves.
Figure 12:
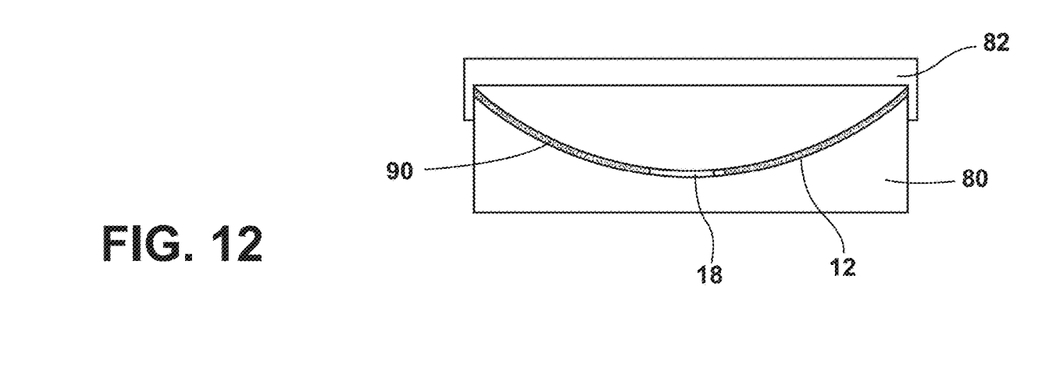
FIG. 12 is a schematic view illustrating two mold halves during injection molding of a housing around a light sensor lens.

With reference now to FIGS. 10-12, one embodiment of a molding method is illustrated. The molding method includes first and second mold halves 80, 82, respectively, configured to construct the housing 12 of the rear view assembly 10. The first mold half 80 includes a generally recessed portion 84 and the second mold half 82 includes a generally protruding portion 86. The light sensor lens 18 is positioned between the first mold half 80 and the second mold half 82 prior to injection of polymeric material that defines the housing 12. The light sensor lens 18 may be constructed from a polycarbonate (PC) material, for example. The housing 12 may be constructed from a polycarbonate material plus acrylonitrile butadiene styrene (ABS). As shown in FIG. 11, the light sensor lens 18 is positioned between the first and second mold halves 80, 82 and the first and second mold halves 80, 82 are joined. Subsequently, PC+ABS is pumped between the first and second mold halves 80, 82 to fill a mold cavity 90 defined between the first and second mold halves 80, 82. The shape of the mold cavity 90 is generally consistent with the shape of the housing 12. Once complete, and the PC+ABS materials have set, the first and second mold halves 80, 82 are separated and the housing 12 with the integrally formed light sensor lens 18 is removed so that another light sensor lens can be positioned between the first and second mold halves 80, 82 and the process can start again.

The integral construction of the light sensor lens 18 with the housing 12 as set forth herein, provide a robust assembly that minimizes the likelihood of accidental removal of the light sensor lens 18. In addition, extra material in the housing 12 for snap clips or mechanical fasteners is eliminated, saving on weight and additional material used to make snaps, fasteners, etc. on the housing 12 or light sensor lens 18. In addition, with the removal of the snaps, fasteners, etc., this sleek design provides extra space inside the housing 12 for the other components of the rear view assembly 10. Moreover, process steps are eliminated as fastening the light sensor lens 18 in place is no longer necessary and monetary savings can be had because additional fasteners are not needed.

It will be understood that the light sensor lens 18 as set forth herein may be used with a variety of sensors, including both ambient light sensors and glare sensors. In the case of a glare sensor, the light sensor lens 18 would be integrally formed with the housing 12 or a bezel operably coupled with the housing 12, but on a front portion of the rear view assembly 10. The glare sensor lens would be positioned on the front portion of the rear view assembly 10 to detect glare from trailing vehicles.

It will also be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A rear view assembly comprising:
   a housing;
   an electro-optic assembly disposed within the housing;
   an ambient light sensor operably coupled with the electro-optic assembly; and
   an at least partially light transmissive light sensor lens integrally formed as part of the housing proximate the ambient light sensor, the light sensor lens being free of mechanical fasteners, the light sensor lens including a body and a protrusion extending from the body.

2. The rear view assembly of claim 1, wherein an inside surface of the light sensor lens is generally flush with an inside surface of the housing.

3. The rear view assembly of claim 1, wherein an outside surface of the light sensor lens is generally flush with an outside surface of the housing.

4. The rear view assembly of claim 1, further comprising:
   a circumferential flange that extends about the light sensor lens, and which is received in a circumferential slot defined in the housing.

5. The rear view assembly of claim 1, wherein the protrusion is at least partially concealed such that the protrusion is not visible outside of the housing.

6. The rear view assembly of claim 1, wherein the light sensor lens includes a generally planar circumferential portion that extends about the body of the light sensor lens.

7. The rear view assembly of claim 6, wherein the circumferential portion extends about a plurality of parallel ridges disposed on an external surface of the body of the light sensor lens.

8. A rear view assembly comprising:
   a housing;
   an electro-optic assembly disposed within the housing;
   an ambient light sensor operably coupled with the electro-optic assembly; and
   an at least partially light transmissive light sensor lens integrally formed as part of the housing proximate the ambient light sensor, the light sensor lens including:
   a body having a plurality of ridges disposed on at least one side of the body; and
   a circumferential flange embedded within the housing.

9. The rear view assembly of claim 8, wherein an inside surface of the light sensor lens is generally flush with an inside surface of the housing.

10. The rear view assembly of claim 8, wherein an outside surface of the light sensor lens is generally flush with an outside surface of the housing.

11. The rear view assembly of claim 8, wherein the body of the light sensor lens includes a protrusion extending therefrom.

12. The rear view assembly of claim 8, wherein the light sensor lens includes a generally planar circumferential portion that extends about the body of the light sensor lens.

13. A method of making a rear view assembly, comprising:
   providing a first mold half;
   inserting an at least partially light transmissive light sensor lens into the first mold half;

operably coupling a second mold half to the first mold half;
injecting a polymeric material between the first mold half and the second mold half to define at least a portion of a rear view assembly housing;
removing the rear view assembly housing from the first and second mold halves; and
inserting an electro-optic assembly into the housing; and
positioning an ambient light sensor proximate the light sensor lens.

14. The method of claim 13, further comprising:
at least partially encasing a protrusion extending from the light sensor lens within a wall of the rear view assembly housing.

15. The method of claim 13, further comprising:
completely encasing a circumferential flange extending about a body of the light sensor lens within a wall of the rear view assembly housing.

16. The method of claim 13, further comprising:
aligning the light sensor lens with the rear view assembly housing such that the light sensor lens is generally flush with an outside surface of the rear view assembly housing.

17. The method of claim 13, further comprising:
aligning the light sensor lens with the rear view assembly housing such that the light sensor lens is generally flush with an inside surface of the rear view assembly housing.

18. The method of claim 13, further comprising:
forming the rear view assembly housing with a receiving slot for receiving a portion of the light sensor lens.

* * * * *